United States Patent
Sierra et al.

(10) Patent No.: US 7,363,585 B1
(45) Date of Patent: Apr. 22, 2008

(54) METHODS AND ARRANGEMENTS FOR PROVIDING NON-MODEL REMINDER INFORMATION IN A GRAPHICAL USER INTERFACE

(75) Inventors: Giampiero M. Sierra, Seattle, WA (US); Christopher A. Evans, Redmond, WA (US); Jennifer L. Shetterly, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/544,507

(22) Filed: Apr. 6, 2000

Related U.S. Application Data

(60) Provisional application No. 60/171,212, filed on Dec. 15, 1999.

(51) Int. Cl.
*G06F 3/00* (2006.01)
(52) U.S. Cl. ............... 715/710; 715/741; 715/780; 715/711
(58) Field of Classification Search ............ 345/710, 345/715, 741, 780, 711
See application file for complete search history.

(56) References Cited

U.S. PATENT DOCUMENTS

| | | | |
|---|---|---|---|
| 5,008,810 A | | 4/1991 | Kessel et al. |
| 5,121,475 A | | 6/1992 | Child et al. |
| 5,425,102 A | | 6/1995 | Moy ............... 380/25 |
| 5,546,521 A | | 8/1996 | Martinez |
| 5,557,731 A | | 9/1996 | Li et al. |
| 5,736,984 A | * | 4/1998 | Jellinek et al. ......... 345/710 |
| 5,740,035 A | * | 4/1998 | Cohen et al. ............. 705/10 |
| 5,754,176 A | | 5/1998 | Crawford ............... 345/338 |
| 5,793,952 A | | 8/1998 | Limsico |
| 5,895,455 A | * | 4/1999 | Bellinger et al. .......... 705/35 |
| 5,956,709 A | * | 9/1999 | Xue ............................ 707/3 |
| 5,986,568 A | * | 11/1999 | Suzuki et al. ......... 340/825.52 |

(Continued)

FOREIGN PATENT DOCUMENTS

EP 0 816 991 A1 1/1998

(Continued)

OTHER PUBLICATIONS

"Time-Dependent Unsolicited Help", 700 IBM Technical Disclosure Bulletin, 31 (Aug. 1988) 1 page.

(Continued)

*Primary Examiner*—Weilun Lo
*Assistant Examiner*—Mylinh Tran
(74) *Attorney, Agent, or Firm*—Lee & Hayes, PLLC

(57) ABSTRACT

Methods and arrangements are provided that display at least one user input field within a graphical user interface and automatically display reminder information associated with the user input field through a non-modal mechanism within the graphical user interface. The methods and arrangements monitor user input activities and automatically display the reminder information associated with the user input field through the non-modal mechanism after a defined period of user input inactivity. For example, if a user is unable to remember a password, then the methods and arrangements provide for an automatic non-intrusive way for the reminder information, which the user previously entered when setting up their password/account, to be displayed. A tip balloon is one type of a non-modal display mechanism that does require the user to respond and does not interfere graphically and/or operationally with the ongoing graphical user interface supported process.

6 Claims, 3 Drawing Sheets

U.S. PATENT DOCUMENTS

| | | | |
|---|---|---|---|
| 5,991,882 A * | 11/1999 | O'Connell | 713/201 |
| 5,995,101 A * | 11/1999 | Clark et al. | 345/711 |
| 6,073,119 A * | 6/2000 | Bornemisza-Wahr et al. | 705/42 |
| 6,100,855 A | 8/2000 | Vinson et al. | |
| 6,100,885 A * | 8/2000 | Donnelly et al. | 345/762 |
| 6,337,702 B1 * | 1/2002 | Bates et al. | 345/857 |
| 6,493,006 B1 | 12/2002 | Gourdol et al. | |
| 6,609,106 B1 * | 8/2003 | Robertson | 705/26 |
| 6,662,340 B2 | 12/2003 | Rawat et al. | |
| 6,763,496 B1 | 7/2004 | Hennings et al. | |
| 2002/0091993 A1 | 7/2002 | Walley et al. | |
| 2002/0175955 A1 | 11/2002 | Gourdol et al. | |
| 2003/0084115 A1 | 5/2003 | Wood et al. | |
| 2003/0229608 A1 | 12/2003 | Reynar et al. | |
| 2004/0006480 A1 | 1/2004 | Ehlen et al. | |
| 2005/0149395 A1 | 7/2005 | Henkin et al. | |
| 2006/0026534 A1 | 2/2006 | Ruthfield et al. | |
| 2006/0129835 A1 * | 6/2006 | Ellmore | 713/183 |

FOREIGN PATENT DOCUMENTS

| | | |
|---|---|---|
| EP | 0816991 | 1/1998 |
| GB | 2 341 952 A | 3/2000 |
| GB | 2341952 | 3/2000 |
| WO | WO2006013372 | 2/2006 |

OTHER PUBLICATIONS

"User Assistance", Apple Human Interface Guidelines: User Assistance, retreived on Jun. 21, 2006 from <<http:// developer.apple.com/documentation/userexperience/Conceptual/OSXHIGuidelines/...>>, 3 pages.

Millard, et al., "Construction of a Contextually-Aware Pervasive Computing Environment", School of Electronics and Computer Science, University of Southampton, 9 pages, no date.

* cited by examiner

METHODS AND ARRANGEMENTS FOR PROVIDING NON-MODEL REMINDER INFORMATION IN A GRAPHICAL USER INTERFACE

RELATED APPLICATION

This U.S. Non-provisional Application for Letters Patent claims the benefit of priority from, and hereby incorporates by reference the entire disclosure of, co-pending U.S. Provisional Application for Letters Patent Ser. No. 60/171,212, filed Dec. 15, 1999.

TECHNICAL FIELD

This invention relates to computers and software, and more particularly to methods and arrangements for selectively providing reminder information, in a non-modal manner, within a graphical user interface (GUI) computing environment.

BACKGROUND OF THE INVENTION

Computer systems and other resources are typically protected from inadvertent use and/or otherwise unauthorized access through the use of user names and passwords. The passwords are meant to be secret. Those entering the correct user name and password are allowed to access the protected computing resources, data, etc.

A user may be required to remember several different user names and/or passwords. For example, a user may have a company defined user name at work that is associated with a password of their choosing. The same user may have another user name and password for use with a home network, the Internet, an intranet, a World Wide Web (WWW) page, or the like. Keeping track of these different identifiers can be difficult.

Consequently, a recent trend calls for the inclusion of a user defined password reminder or hint that can be manually requested by the user whenever he/she cannot remember the password. Thus, for example, if the user's password is "Rover", then the password reminder may be "The name of my first pet when I lived in Michigan". Hence, the user could request this hint when trying to remember "Rover".

One of the drawbacks to this type of password reminder is that the user needs to actively initiate the reminder. Another drawback is that the reminder information is usually displayed in a modal dialog format that retains the focus of the graphical user interface until acknowledged or otherwise explicitly shutdown. Thus, users typically need to ask for the hint and then acknowledge the hint. This tends to waste time and may frustrate certain users.

It would be advantageous to have improved methods and arrangements that automatically display reminder information at appropriate times, without requiring any additional user input or interfering with the user's ability to interact with the graphical user interface.

SUMMARY OF THE INVENTION

The present invention provides improved methods and arrangements that automatically display reminder information at appropriate times, without requiring any additional user input and without significantly interfering with the user's ability to interact with the graphical user interface.

Thus, for example, the above stated needs and others are met by a method that includes displaying at least one user input field within a graphical user interface, and automatically displaying reminder information associated with the user input field through a non-modal mechanism within the graphical user interface. The method may further include monitoring user input activities and automatically displaying the reminder information associated with the user input field through the non-modal mechanism after a defined period of user input inactivity. For example, if a user is unable to remember a password, then the method provides an automatic non-intrusive way for the reminder information, which the user previously entered when setting up their password, to be displayed. A tip balloon is one type of a non-modal display mechanism -that does require the user to respond and does not interfere graphically and/or operationally with the ongoing graphical user interface supported process.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
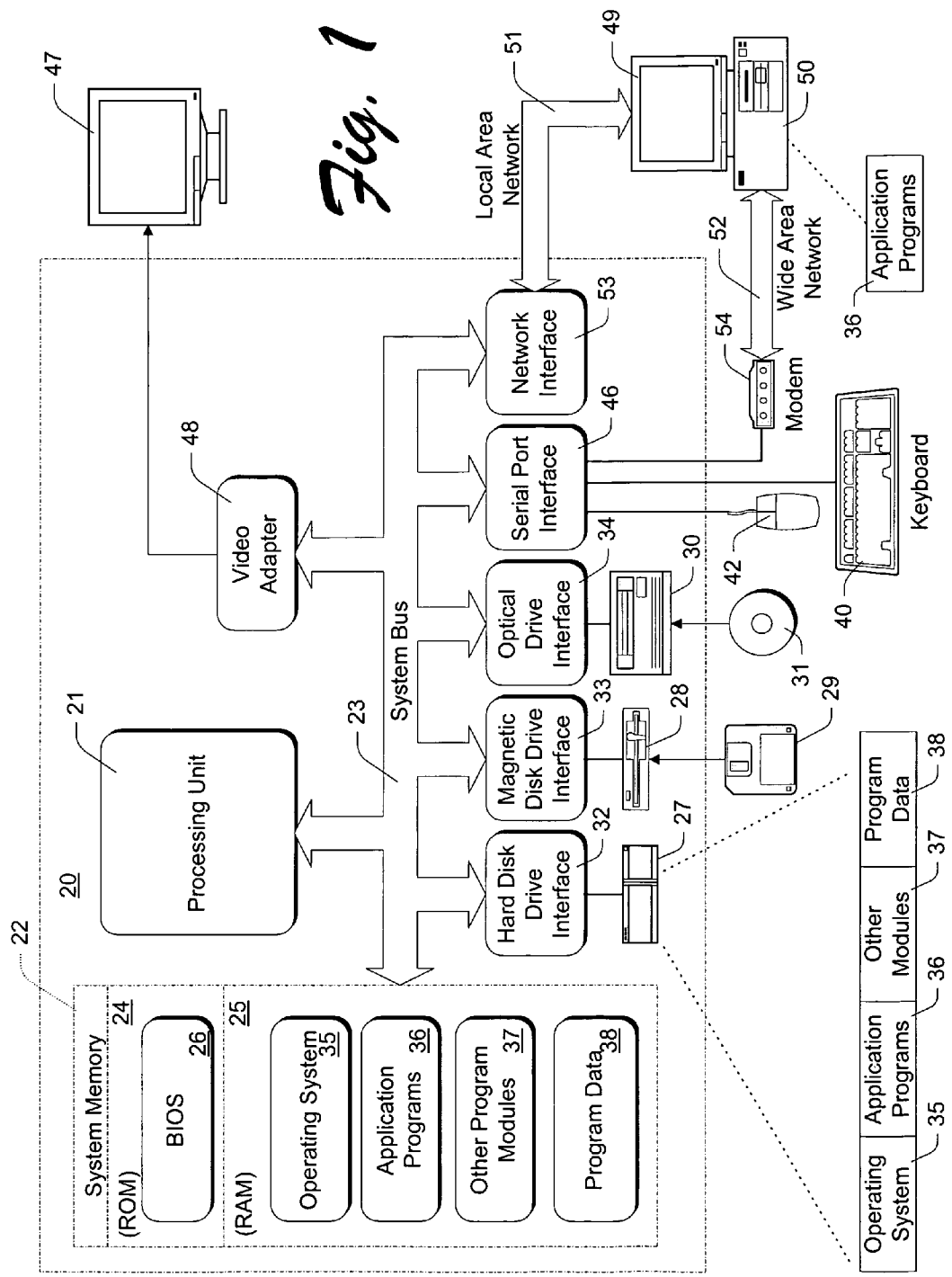
FIG. 1 is a block diagram depicting an exemplary computer system suitable for use in the inputting and the outputting of user reminder information.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment; computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
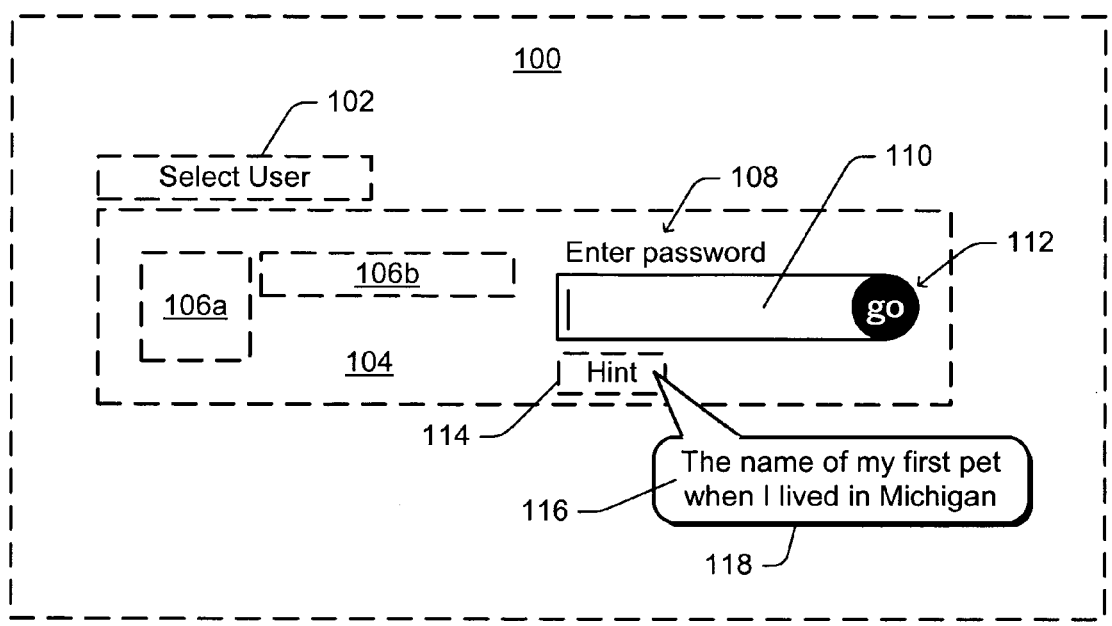
FIG. 2 is an illustrative representation of user reminder information being displayed in a non-modal manner using a computer system, for example, as in FIG. 1.

Reference is now made to FIG. 2, which is an illustrative representation of user reminder information being displayed in a non-modal manner using computer 20. As shown, a non-modal, tip balloon or hint balloon 116 is selectively displayed within a graphical user interface (GUI) display 100 on display 47 in an attempt to assist a user attempting to logon to computer 20. Here, the user is reminded that his/her password is a pet's name. In this example, it is assumed that computer 20 has been set-up to accommodate the applicable reminder information, as will be described in subsequent sections.

Since there are several pieces of information presented to the user within GUI display 100, the following description will walk-through an exemplary user logon process to highlight various aspects.

As shown, the user is initially prompted to select a user identifier through initial prompt 102. The user can respond by viewing one or more user identifier prompts 104. Thus, if computer 20 is configured to support a plurality of users, then a plurality of user identifier prompts 104 can be displayed. In this example, only one user identifier prompt 104 is shown.

Within user identifier prompt 104, there is at least one selectable user area 106. Here, user identifier prompt 104 includes two different selectable user areas 106*a-b*. Selectable user area 106*a* is a graphical, iconic, or like representation associated with the user. For example, selectable user area 106*a* may include a picture of the user. Selectable user area 106*b* is a textual identification associated with the user. Thus, for example, the user's name may be displayed in selectable user area 106*b*.

Once the user has selected a user identifier, then GUI display 100 further provides the user with a password prompt 108 associated with at least one user input field 110. In this example, password prompt 108 and input field 110 are displayed within user identifier prompt 104 following selection of either selectable user area 106*a* or selectable user area 106*b*.

At this stage in the login process, the user will need to input their password in input field 110 and confirm the input by hitting ENTER on their keyboard 40, or by graphically selecting (e.g., clicking) "go" button 112.

If, for some reason, the user is unable to remember their password, then the user can manually request a "hint" using a manual hint area 114. Manual hint area 114 may include text, graphics, etc. When the user selects manual hint area 114, reminder information 116, which was previously entered by the user during set up, is displayed in a non-modal manner. For example, in FIG. 2, a hint balloon 118 is presented as pointing to manual hint area 114. Hint balloon 118 is non-modal in that it does not interfere with the user's ability to view input field 110 and does not require user acknowledgement in some manner. Instead, hint balloon 118 appears when summoned by the user and then automatically disappears from GUI display 100 when the user inputs information through input field 110.

Since the manual hint requesting process described above requires users to actively solicit a hint, this may lengthen the login process. Thus, in accordance with certain implementations a passively activated hint process is also provided.

In this example, hint balloon 118 is displayed without the user manually requesting it whenever the user appears to be having trouble remembering their password. Thus, for example, if the user has failed to input information into input field 110 for a given amount of time, then hint balloon 118, or other like non-modal display mechanism, is activated to show the user reminder information 116. Accordingly, a timing mechanism can be implemented within the logon process that monitors the user inputs and selectively activates hint balloon 118.

By way of example, in certain implementations the timing mechanism is preferably set to at least about three (3) seconds. In other implementations, the timing mechanism is set to about ten (10) seconds. In still other implementations, the timing mechanism is set to about twenty (20) seconds. Once the user begins to input their password, then hint balloon 118 goes away.

Figure 3:
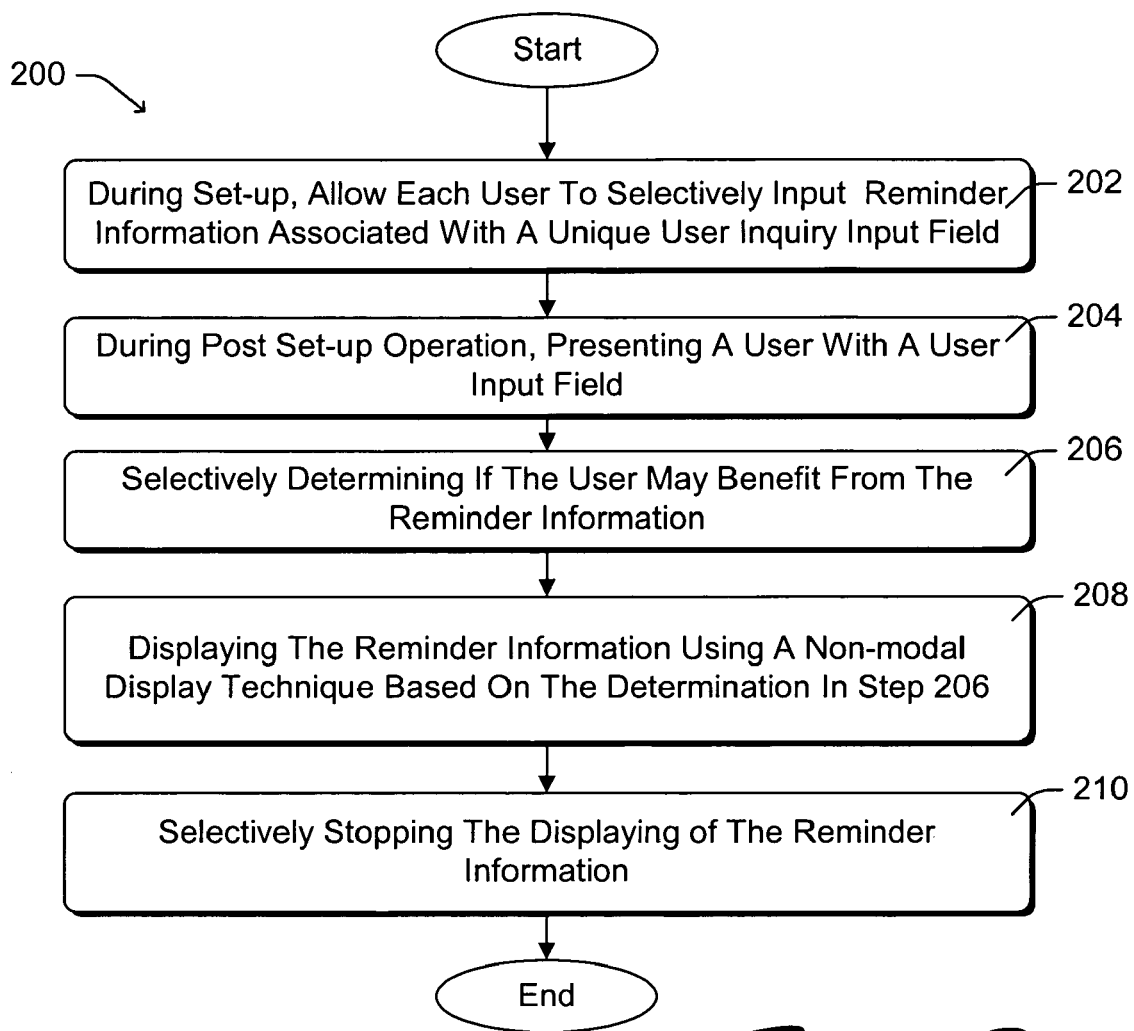
FIG. 3 is flowchart depicting a process for inputting and outputting user reminder information in a non-modal manner using a computer system, for example, as in FIG. 1.

With this in mind, FIG. 3 is flowchart depicting a process 200 for inputting and selectively outputting user reminder information 116.

Step 202 is performed as part of the user's set-up process, wherein the user is typically permitted to input their password, and confirm their password. The set-up process can support, for example, access to an operating system. In step 202, the user is also permitted to input reminder information 116. Certain users may decide not to input reminder information 116. For these users, there is no manual or automatic displaying of hint balloon 118.

For users that do input reminder information 116, manual and automatic displaying of the reminder information 116 through hint balloon 118, for example, is available. Thus, per step 204, during subsequent logon the user is provided with at least one user input field 110. In step 206, it is determined if the user may benefit from the reminder information. This can be accomplished as described above by monitoring the user's inactivity with respect to the input field. Next, in step 208, the reminder information is displayed using a non-modal technique, such as, for example, hint balloon 118.

In step 210, the reminder information 116 is no longer displayed to the user. Thus, for example, as the user begins providing an input through input field 110 then, according to step 210, hint balloon 118 is no longer displayed.

Process 200 may also be configured to be recursive by returning to step 206 from step 210. In this manner, if a user is distracted or hesitating at some point while entering their password, then hint balloon 118 can be displayed/re-displayed.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

The invention claimed is:

1. A method for use in a graphical user interface configured to support a login operation, the method comprising:
displaying at least one user identifier prompt within a graphical user interface, the at least one user identifier prompt including at least one selectable user area operatively associated with a previously configured user capable of completing a login operation by inputting user password input;
upon receiving user input selecting the at least one selectable user area, displaying at least one user input field within the graphical user interface, wherein the at least one user input field is automatically configured to operatively receive user password input associated with the login operation; and
while conditions allow for the reception of the user password input and it is determined that there has been a failure to operatively receive the user password input for the login operation, then automatically displaying reminder information associated with the user input field through a non-modal mechanism within the graphical user interface, wherein the display of the reminder information is removed upon receipt of a beginning of an input via the at least one user input field.

2. The method as recited in claim 1, wherein the reminder information includes user provided password reminder information.

3. A computer-readable medium having computer-executable instructions for causing at least one processing unit to support a login operation by performing steps comprising:
displaying at least one user identifier prompt within a graphical user interface, the at least one user identifier prompt including at least one selectable user area operatively associated with a previously configured user capable of completing a login operation by inputting user password input;
upon receiving user input selecting the at least one selectable user area, displaying at least one user input field on the display within the graphical user interface, wherein the at least one user input field is automatically configured to operatively receive user password input associated with the login operation;
determining if there has been a failure to operatively receive the user password input for the login operation while conditions allow for the reception of the user input, wherein the failure is detected at least in part by failure to receive the user password input for a given amount of time;
automatically displaying reminder information associated with the user input field through a non-modal mechanism within the graphical user interface based on the failure to operatively receive the user password input; and
removing reminder information associated with the user input field upon beginning to input a second user password.

4. The computer-readable medium as recited in claim 3, wherein the reminder information includes user provided password reminder information.

5. An arrangement comprising:
memory;
a display device;
a user input device; and
a processor operatively coupled to the memory, the display device and the user input device, the processor being configured to:
display at least one user identifier prompt within a graphical user interface on the display device, the at least one user identifier prompt including at least one selectable user area operatively associated with a previously configured user capable of completing a login operation by inputting user password input;
receive user input selecting the at least one selectable user area, and in response display at least one user input field within the graphical user interface, wherein the at least one user input field is automatically configured to operatively receive user password input associated with the login operation;
determine if there has been a failure to operatively receive the user password input for the login operation while conditions allow for the reception of the user input;
automatically display reminder information associated with the user input field through a non-modal mechanism as a hint balloon within the graphical user interface based on the failure to operatively receive the user password input; and
remove the hint balloon upon receiving a second input.

6. The arrangement as recited in claim 5, wherein the reminder information includes user provided password reminder information previously stored in the memory.

* * * * *